(12) United States Patent
Kakarala et al.

(10) Patent No.: US 6,828,384 B2
(45) Date of Patent: Dec. 7, 2004

(54) THERMOPLASTIC OLEFIN COMPOSITION, PROCESS OF MAKING THE COMPOSITION, ARTICLES FORMED FROM THE COMPOSITION, AND A METHOD OF FORMING ARTICLES THEREFROM

(75) Inventors: Srimannarayana Kakarala, Bloomfield Hills, MI (US); Jason B. Clock, Kettering, OH (US); Marty D. Skirha, Vandalia, OH (US)

(73) Assignee: Delphi Technologies Inc., Troy, MI (US)

( * ) Notice: Subject to any disclaimer, the term of this patent is extended or adjusted under 35 U.S.C. 154(b) by 60 days.

(21) Appl. No.: 10/173,965

(22) Filed: Jun. 18, 2002

(65) Prior Publication Data

US 2003/0199637 A1 Oct. 23, 2003

Related U.S. Application Data

(63) Continuation-in-part of application No. 10/124,939, filed on Apr. 17, 2002.

(51) Int. Cl.⁷ .............................. C08F 8/00; C08L 9/00; C08L 23/00; C08L 23/04; C08L 47/00
(52) U.S. Cl. ...................... 525/191; 525/216; 525/232; 525/240
(58) Field of Search ................................. 525/191, 216, 525/232, 240

(56) References Cited

U.S. PATENT DOCUMENTS

| | | | |
|---|---|---|---|
| 4,275,912 A | 6/1981 | Bayer | |
| 4,413,856 A | 11/1983 | McMahan et al. | |
| 4,634,735 A | * 1/1987 | Thiersault et al. | 525/88 |
| 4,679,837 A | 7/1987 | Bayer et al. | |
| 4,998,761 A | 3/1991 | Bayer et al. | |
| 5,091,435 A | * 2/1992 | Suzuki et al. | 521/134 |
| 5,206,294 A | 4/1993 | Dawson | |
| 5,219,197 A | 6/1993 | Rich et al. | |
| 5,290,078 A | 3/1994 | Bayer et al. | |
| 5,385,375 A | 1/1995 | Morgan et al. | |
| 5,721,314 A | 2/1998 | Hausmann | 525/71 |
| 5,721,315 A | 2/1998 | Evans et al. | 525/74 |
| 5,783,629 A | 7/1998 | Srinivasan et al. | 525/63 |
| 5,783,630 A | 7/1998 | Evans et al. | 525/74 |
| 5,883,188 A | 3/1999 | Hwang et al. | 525/71 |
| 5,942,576 A | 8/1999 | Evans et al. | 525/73 |
| 5,959,032 A | 9/1999 | Evans et al. | 525/74 |
| 5,965,667 A | 10/1999 | Evans et al. | 525/74 |
| 5,985,999 A | 11/1999 | Dominguez et al. | 525/74 |
| 6,107,404 A | 8/2000 | Ryntz | 525/191 |
| 6,120,714 A | 9/2000 | Allan et al. | 264/69 |
| 6,153,680 A | 11/2000 | Shah et al. | 524/425 |
| 6,204,328 B1 | 3/2001 | Sanpei et al. | |
| 6,218,032 B1 | 4/2001 | Berta | |
| 6,245,856 B1 | 6/2001 | Kaufman et al. | |
| 6,261,489 B1 | 7/2001 | Matsuki et al. | |
| 6,515,074 B2 | 2/2003 | Kakarala et al. | 525/191 |

OTHER PUBLICATIONS http://www.kittermanplastics.com/vacuum.htm (Process: Vacuum Forming, pp. 1–2).
http://www.matrixplastics.com/thermo.htm (Thermoforming (Vacuum or Pressure), p. 1.
http://www.vistar-online.com/forming.html (Vistar Technologies, Inc., The Thermoforming Process—Vacuum/Pressure Forming, pp. 1–3).
http://www.formedplastics.com/pressure.html (Formed Plastics, Inc., Pressure/Vacuum Forming, pp. 1–2).
http://members.aol.com/GCCnssnway/vacuform.htm (Vacuum Forming, pp. 1–7).

* cited by examiner

*Primary Examiner*—Nathan M. Nutter

(57) ABSTRACT

Disclosed herein is a thermoplastic olefin composition, comprising, based on the total weight of the composition: about 20 wt % to about 40 wt % polypropylene; about 20 wt % to about 70 wt % ethylene copolymer; and less than or equal to about 30 wt % linear low density polyethylene, a process of forming the thermoplastic olefin composition, a process for vacuum forming an article comprising the composition, an article of manufacture comprising the composition, and an automotive assembly comprising, based on the total weight of the assembly: about 20 to about 40 wt % polypropylene; about 20 to about 70 wt % ethylene copolymer; and less than or equal to about 30 wt % linear low density polyethylene.

90 Claims, No Drawings

US 6,828,384 B2

THERMOPLASTIC OLEFIN COMPOSITION, PROCESS OF MAKING THE COMPOSITION, ARTICLES FORMED FROM THE COMPOSITION, AND A METHOD OF FORMING ARTICLES THEREFROM

CROSS REFERENCE TO RELATED APPLICATIONS

The present application is a continuation-in-part application of U.S. pateny Application Ser. No. 10/124,939. filed Apr. 17, 2002, which is hereby incorporated by reference in its entirety.

TECHNICAL FIELD

The present disclosure relates to thermoplastic olefin compositions, specifically to a thermoplastic olefin compositions for vacuum forming.

BACKGROUND

Vacuum forming includes both positive molds (i.e., male) and/or negative impressions (i.e., female). A typical vacuum forming process includes employing a negative pressure (i.e., a vacuum), between a sheet of material to be molded and the mold itself. The sheet is typically heated to a controlled softening temperature and subsequently stretched to conform to the mold contours to impart a desired shape of the part. This process may also be assisted by a plug assist and/or one or more vacuum holes in the mold. Once formed, the molded material is then cooled and the excess material removed (e.g., trimmed) to yield a final part and/or assembly.

Material properties that affect vacuum forming include melt flow rate, depth of draw, resistance to thinning, coefficient of friction, grain retention, and the like. However, material properties required for negative or female vacuum forming, also known as mold grain forming applications, are typically different from or even in opposite to those required for male vacuum forming applications. For example, in male vacuum forming, a high grain retention after vacuum forming is preferred. In contrast, in female vacuum forming, a relatively high melt flow rate to allow for greater depth of draw and increased resistance to excessive thinning, along with a lower coefficient of friction on tool surfaces are preferred. Accordingly, materials suitable for male vacuum forming may not necessarily be suitable for female vacuum forming. Since male vacuum forming is practiced almost to the exclusion of female vacuum forming, it would be beneficial to have materials suitable for female vacuum forming. Of particular benefit would be a thermoplastic olefin compositions suitable for female vacuum forming, preferably both male and female vacuum forming.

SUMMARY

Disclosed herein is a thermoplastic olefin composition, comprising, based on the total weight of the composition: about 20 wt % to about 40 wt % polypropylene; about 20 wt % to about 70 wt % ethylene copolymer; and less than or equal to about 30 wt % linear low density polyethylene.

Also disclosed herein is a process of forming a thermoplastic olefin composition comprising: combining, based on the total weight of the composition, about 20 wt % to about 40 wt % polypropylene; about 20 wt % to about 70 wt % ethylene copolymer; and less than or equal to about 30 wt % linear low density polyethylene, to produce the thermoplastic olefin composition.

Further disclosed herein is a thermoplastic olefin composition, comprising a reaction product of, based on the total weight of the composition: about 20 wt % to about 40 wt % polypropylene; about 20 wt % to about 70 wt % ethylene copolymer; and less than or equal to about 30 wt % linear low density polyethylene.

Additionally disclosed herein is a process for vacuum forming an article, comprising: mixing about 20 wt % to about 40 wt % polypropylene, about 30 wt % to about 70 wt % ethylene copolymer, and less than or equal to about 30 wt % linear low density polyethylene to form a blend, based upon a total weight of the blend; and forming a sheet from the blend; heating the sheet to a softening temperature; disposing the sheet in a mold; and vacuum forming the sheet into an article.

Also disclosed herein is an article of manufacture comprising, based on the total weight: about 20 wt % to about 40 wt % polypropylene; about 20 wt % to about 70 wt % ethylene copolymer; and less than or equal to about 30 wt % linear low density polyethylene.

In addition, disclosed herein is an automotive assembly comprising, based on the total weight of the assembly: about 20 wt % to about 40 wt % polypropylene; about 20 wt % to about 70 wt % ethylene copolymer; and less than or equal to about 30 wt % linear low density polyethylene.

The above described and other features are exemplified by the following detailed description.

DETAILED DESCRIPTION

Described herein are thermoplastic olefin compositions, processes for preparing these compositions, and articles of manufacture prepared from these compositions. Preferably, these compositions are flexible, in that they have a flex modulus of less than about 60,000 pounds per square inch (psi), and more preferably less than or equal to about 50,000 psi. Also within this range, the flex modulus is preferably greater than or equal to about 10,000 psi, and more preferably greater than or equal to about 20,000 psi.

The thermoplastic olefin composition disclosed herein comprises about 20 to about 40 wt % polypropylene. Preferably within this range, the polypropylene concentration is greater than or equal to about 25 wt %. Also within this range, the polypropylene concentration is preferably less than or equal to about 35 wt %, with the more preferred concentration of polypropylene being equal to about 30 wt %.

Suitable polypropylene for use herein includes, but is not limited to, crystalline polypropylene, which may include, in addition to the homopolymer, minor amounts of various other materials. As used herein, minor amounts means less than or equal to about 15 wt %, based on the total weight of the polypropylene in the composition, and various other materials is meant to include polyethylene, polypropylene-polyethylene block copolymer, random polypropylene-polyethylene copolymer, and the like, as well as combinations comprising at least one of the foregoing. In addition, polypropylene polymers preferably include those having a melt index of less than or equal to about 1 gram per 10 minutes (g/10 min.), when measured according to as ASTM test method D-1238 (e.g., at 230° C., employing a 2.16 kilogram (kg) mass).

The thermoplastic olefin composition further comprises about 20 to about 70 wt % ethylene copolymer. Preferably within this range, the ethylene copolymer concentration is greater than or equal to about 40, more preferably greater than or equal to about 50, still more preferably greater than or equal to about 55 wt %, based on the total composition. Also within this range, the ethylene copolymer concentration is preferably less than or equal to about 65 wt % based on the total composition.

Suitable ethylene copolymers include, but are not limited to, ethylene propylene rubber, ethylene butene rubber, ethylene octene rubber, and the like, as well as combinations comprising at least one of the foregoing. Preferably, the ethylene copolymers have a glass transition temperature of less than or equal to about negative 70° C. (−70° C.). More preferably, the ethylene copolymer includes an ethylene-propylene non-conjugated diene copolymer (hereinafter EPDM). The non-conjugated dienes component of the EPDM may include about 6 to about 22 carbon atoms and also may have at least one readily polymerizable carbon-carbon double bond. Also preferably, the EPDM includes an uncrosslinked ethylene propylene copolymer rubber portion having about 60 to about 80 wt % ethylene, based on the total weight of the EPDM. Within this range, the uncrosslinked ethylene propylene copolymer rubber portion preferably includes greater than or equal to about 65 wt %, based on the total weight of the EPDM present. Also within this range, the uncrosslinked ethylene propylene copolymer rubber portion is preferably less than or equal to about 75 wt %, based on the total weight of the EPDM present. As used herein, uncrosslinked ethylene propylene copolymer rubber means the ethylene copolymer is soluble in a suitable solvent (e.g., a hydrocarbon solvent).

The EPDM may also include a non-conjugated diene portion. Preferably, the concentration of non-conjugated diene in the EPDM is about 1 to about 7 wt % of the total weight of the EPDM present. Preferably within this range, the concentration of non-conjugated diene portion is greater than or equal to about 2 wt %, based on the total weight of the EPDM present. Also preferably within this range, the concentration of non-conjugated diene portion is less than or equal to about 5 wt %, based on the total weight of the EPDM present.

EPDM copolymers that are especially preferred include ethylene propylene-1,4-hexadiene, ethylene propylene dicyclopentadiene, ethylene propylene norbornene, ethylene propylene-methylene-2-norbornene, and ethylene propylene-1,4-hexadiene/norbornadiene copolymers. These materials being preferred because they provide a depth of draw and/or a soft touch feel to the final thermoplastic olefin composition. It is also preferred that the ethylene copolymers have melt indices of less than or equal to about 1 g/10 min, when measured according to method ASTM D-1238 (e.g., at 230° C., employing a 2.16 kilogram (kg) mass).

The thermoplastic olefin composition, when present, may also comprise linear low density polyethylene (hereinafter LLDPE) in an amount less than or equal to about 30 wt %. Preferably within this range, the LLDPE concentration is greater than or equal to about 5 wt % based on the total composition. Also within this range, the LLDPE concentration is preferably less than or equal to about 20, more preferably less than or equal to about 10 wt %, based on the total weight of the composition. Preferred LLDPE materials include those having melt indices (test method of about 0.05 to about 5.0 g/10 min, when measured according to method ASTM D-1238 (e.g., at 230° C., employing a 2.16 kilogram (kg) mass). Within this range, the melt indices is preferably greater than or equal to about 0.5 g/10 min. Also within this range, the melt indices is preferably less than or equal to about 2.0, and more preferably less than or equal to about 1.0 g/10 min.

The thermoplastic olefin composition may further comprise a suitable polymer modifying component including, for example, a free radical initiator, a pre-radical controlling co-agent component, a heat stabilizer, a light stabilizer, a color additive, or a combination comprising at least one of the foregoing.

A suitable free radical initiator is preferably an organic peroxide, more preferably an organic peroxide having a half life of less than or equal to about 1 hour at a temperature of greater than or equal to about 100° C. Preferred organic peroxides include, for example, 1,1-di-t-butyl peroxy-3,3,5-trimethyl cyclohexane, dicumyl peroxide, 2,5-dimethyl-2,5-di{t-butyl peroxy} hexane, t-butyl-cumyl peroxide, di-t-butyl peroxide, 2,5-dimethyl-2,5-di-(t-butyl peroxy) hexyne, and the like, as well as combinations comprising at least one of the foregoing peroxides, with di cumyl peroxide being more preferred. Additional organic peroxide crosslinking agents suitable for use herein also include those listed in the Handbook of Polymer Foams and Technology, incorporated herein by reference$_{[MLC1]}$. Free radical initiators, when present, are employed at an initial concentration of about 0.05 to about 0.5 wt % based upon the total weight of the thermoplastic olefin composition. Preferably, within this range, free radical initiators are added in an amount greater than or equal to about 0.10 wt % based upon the total weight of the thermoplastic olefin composition. Also within this range, free radical initiators are preferably added in an amount less than or equal to about 0.40 wt %, based upon the total weight of the thermoplastic olefin composition.

The thermoplastic olefin composition may also comprise a suitable co-agent for controlling a pre-radical reaction, also known as a pre-radical controlling Co-agent component. Preferred pro-radical controlling co-agent components include tri-methylolpropane trimethacrylatetrihaeal (e.g., TM-350 commercially available from Sartomer Co. located in Pennsylvania), and the like. Preferably, a pre-radical controlling co-agent component, when present, has a concentration of about 0.05 to about 0.5 wt. %, based upon the total weight of the thermoplastic olefin composition. Preferably, within this range, the pre-radical controlling co-agent component is added in an amount greater than or equal to about 0.10 wt % based upon the total weight of the thermoplastic olefin composition. Also within this range, the pre-radical controlling co-agent component is added in an amount less than or equal to about 0.40 wt %, based upon the total weight of the thermoplastic olefin composition.

The thermoplastic olefin composition may also include a stabilizer such as, for example, a heat stabilizer, a light stabilizer, and the like, as well as combinations comprising at least one of the foregoing stabilizers. Heat stabilizers include phenolics, hydroxyl amines, phosphites, and the like, as well as combinations comprising at least one of the foregoing heat stabilizers. Light stabilizers include low molecular weight hindered amines (defined herein as having a number-average molecular weight (AMU) less than about 1,000 AMU), high molecular weight hindered amines (defined herein as having a number-average molecular weight greater than about 1,000 AMU), and the like, as well as combinations comprising at least one of the foregoing light stabilizers. Suitable stabilizers, and the amount of stabilizer required is readily determined according to the desired characteristics of the finished article by one of skill in the art without undue experimentation, with about 1 to about 4 wt %, based on the total weight of the composition, being preferred herein.

In addition to the above modifying components, the thermoplastic olefin compositions may also comprise a color additive, such as a pigment, a dye, and the like, as well as combinations comprising at least one of the foregoing color additives. The amount of color additive is readily determined according to the desired characteristics of the finished article by one of skill in the art without undue experimentation. Typically for use herein, the concentration of a color additive is less than or equal to about 10 wt %. Preferably, the concentration of the color additive is greater than or equal to about 0.5, more preferably greater than or equal to about 1 wt %, based on the total weight of the composition. Also preferred is a color additive having a concentration of less than or equal to about 5 wt %, based on the total weight of the thermoplastic olefin composition.

For use herein, a thermoplastic olefin composition having properties preferred for female vacuum forming include those with a melt index, when measured according to method ASTM D-1238 (e.g., at 230° C., employing a 2.16 kilogram (kg) mass) of about 1 to about 20 g/10 min. Preferably, within this range, the melt index is less than or equal to about 10 g/10 min. A relatively lower viscosity, as indicated by the composition's melt index, is also desirable for female vacuum forming. Not wishing to be bound by theory, it is believed this is due to the lower viscosity allowing for a facile flow when the material is vacuum formed. Higher flow is also desirable in order to better fill the grain being imparted by the vacuum form tooling. A preferred melt index for male or positive vacuum forming is less than about 6 g/10 min.

The thermoplastic olefin composition is a combination, preferably a blend, formed using reaction extrusion compounding. Suitable processes for forming the composition include melt blending, preferably under high distributive mixing and low shear conditions; in-line compounding; extruding; in-line thermoforming; calendering; and the like, as well as combinations comprising at least one of the foregoing processes. Furthermore, the processing of the materials is preferably in a single manufacturing step. Preferably the processes include concurrent in-line compounding and reactive extruding to form a final sheet and thus eliminating steps directed to pellet processing and the like, as well as reducing the need for heat stabilizers and other additives. In addition, significant time and cost savings can be realized by in-line compounding of the composition followed by thermoforming articles therefrom.

The production processes may be accomplished by employing equipment including, for example, extruders, mixers, kneaders, and the like. Suitable extruders include twin screw or single screw extruders. A particularly well-suited extruder has a L/D (length of screw/barrel diameter) ratio of greater than 28:1, and further includes dispersive and distributive mixing capability. The components may be introduced into the extruder through a combined single feed, or through multiple feeds. In an alternate embodiment, recycled materials (e.g., formed from scraps of a precompounded composition) may be recycled into the process similar to or from which it was formed, and or extruded through an extruder in a separate process. In either embodiment, extrudate is preferably passed from the extruder through a process suitable for forming sheets. For example, the extrudates may be processed through a layer die followed by embossing rollers. For female vacuum forming, a shallow embossed pattern with a depth of less than or equal to about 0.005 inches is desirable. A geometric stipling pattern (e.g., geometric stiple grain) comprising half domes has been found to be particularly preferred. This pattern is employed for the female vacuum forming process to assist in air evacuation during forming and for ease of coating. The extruded sheets are typically transferred to rolls for forming articles of manufacture therefrom.

The female vacuum forming process preferably comprises indexing the extruded sheet into a heating station where a pre-defined thermal pattern heats the sheet to a temperature appropriate for vacuum forming a particular assembly. The heated sheet is then indexed to a vacuum forming station wherein a plug assist may push the sheet into a mold cavity. After the mold is closed, vacuum is applied to pull the sheet into the confines of the cavity, thus imparting a final shape of the assembly or part. During and/or after cooling, the mold is opened (e.g., tool halves forming the female cavity are then separated), and the formed assembly or part, referred to in the art as the skin, is removed.

The thickness of the sheet is preferably less than or equal to about 2 mm thick, preferably about 1 mm thick. In addition to being a single layer, a sheet may also comprise a plurality of layers, at least one of which includes the thermoplastic olefin composition disclosed herein. Thus, layers may be formed, and/or extruded separately, and subsequently combined into a layered sheet. In one embodiment, the first layer comprises virgin material, and the second layer comprises a combination of virgin material and recycled material (e.g., including previously compounded first and second layers).

Suitable sources of polypropylene include those available under the trade name Accpro, available from Bamberger Polymers, Inc., Jericho, N.Y. Suitable sources of ethylene copolymer include those available under the trade name Engage, available from Dow Chemical, Midland, Mich. Suitable sources of LLDPE include those available under the trade name Petrothene, available from Quantum Chemical Inc., Australia.

The following examples illustrate specific thermoplastic olefin compositions suitable for use herein. It should be understood that the examples are given for the purpose of illustration and are not intended as limitations.

TABLE 1

| Component | Sample # (parts per weight unit of total compound) | | | | | | | |
|---|---|---|---|---|---|---|---|---|
| | 1 | 2 | 3 | 4 | 5 | 6 | 7 | 8 |
| Polypropylene | 30 | 30 | 25 | 25 | 25 | 25 | 30 | 30 |
| Ethylene Copolymer | 70 | 70 | 55 | 50 | 50 | 50 | 50 | 60 |
| LLDPE (Linear Low Density Polyethylene) | — | — | 20 | 25 | 25 | 25 | 20 | 10 |
| Phenolic Stabilizer (PHR) | 0.2 | 0.2 | 0.2 | 0.2 | 0.2 | 0.2 | 0.2 | 0.2 |
| Dicumyl Peroxide(PHR) | — | 0.15 | — | 0.1 | 0.2 | 0.3 | 0.15 | 0.15 |
| Co-Agent [TM-350] (PHR) | — | 0.15 | — | 0.3 | 0.2 | 0.1 | 0.15 | 0.15 |
| Color Concentrate (PHR) | 4 | 4 | 4 | 4 | 4 | 4 | 4 | 4 |

The above compositions were tumble mixed by a ribbon blender and fed into a twin screw extruder having a mixing screw configuration to provide high distributive mixing at low shear, and a residence time between about 30 to about 45 seconds. The ingredients were compounded into pellet form. Pellets were extruded in a single screw extruder through a slot die and calendared to a sheet thickness of one millimeter. These sheets were vacuum formed on a negative forming tool. The ease of vacuum forming was determined by given a qualitative rating between 1 and 5, with 1 being the more preferred result in terms of the difficulty of start up and the width of the process window.

Sheets were then subjected to a five finger scratch test. This test comprises dragging a one millimeter steel tip with a 7 Newton (N) load at a set rate across the composition. The resulting scratches were also given a qualitative rating between 1 and 5 as above, and listed in the chart below. Material cost were also rated between 1 and 5 as above, using commercial costs of each ingredient. The melt strength was measured as load to break the filaments exiting the capillary die, measured on the compounded pellets using a capillary rheometer heated to 190° C. fitted with a Gottfert Rheotens attachment.

TABLE 2

| Property | Sample Number | | | | | | | |
|---|---|---|---|---|---|---|---|---|
| | 1 | 2 | 3 | 4 | 5 | 6 | 7 | 8 |
| Melt Strength @ 190° C. [cN] | 7 | 11 | 9 | 13 | 15 | 14 | 13 | 12 |
| Scratch Resistance @ 7 Newtons | 4 | 3 | 2 | 1 | 1 | 1 | 1 | 2 |
| Ease of Vacuum Forming | 5 | 3 | 4 | 3 | 1 | 2 | 2 | 1 |
| Material Cost | 5 | 3 | 1 | 2 | 3 | 4 | 2 | 1 |

Referring to Table 2, the thermoplastic olefin composition described herein exhibits scratch resistance consistent with use in automotive interior skin applications. These thermoplastic olefin compositions, process, and articles made therefrom, are suitable for use in vehicle applications such as interior sheathing and so called "Class A" surfaces, including, for example, instrument panel skins, door panels, air bag covers, roof liners, and seat covers. These articles can also be utilized in numerous applications, including, but not limited to, other transportation interiors such as those found in locomotives, airplanes, and watercrafts, home furnishings, and luggage, among others.

The thermoplastic olefin compositions are particularly useful in female vacuum forming. The compositions are low cost due to the use of commodity raw materials with the concentration of modifiers during the melt mixing process. Further cost reduction is obtained with direct extrusion of the sheet instead of first forming pellets. Additionally the composition comprises a high depth of draw, e.g., greater than or equal to about 250%, enabling the formation of complex contours and undercuts while maintaining good grain formation.

While preferred embodiments have been shown and described, various modifications and substitutions may be made thereto without departing from the spirit and scope of the invention. Accordingly, it is to be understood that the apparatus and method have been described by way of illustration only, and such illustrations and embodiments as have been disclosed herein are not to be construed as limiting to the claims.

What is claimed is:

1. A thermoplastic olefin composition, comprising, based on the total weight of the composition:
   about 20 wt % to about 40 wt % polypropylene, wherein the polypropylene comprises polypropylene homopolymer;
   about 20 wt % to about 70 wt % ethylene copolymer; and
   less than or equal to about 30 wt % linear low density polyethylene.

2. The thermoplastic olefin composition of claim 1, wherein the polypropylene concentration is about 25 wt % to about 35 wt %.

3. The thermoplastic olefin composition of claim 1, having a flex modulus of less than about 60,000 pounds per square inch.

4. The thermoplastic olefin composition of claim 1, further comprising less than or equal to about 15 wt % polyethylene, polypropylene-polyethylene block copolymer, random polypropylene-polyethylene copolymer or a combination comprising at least one or the foregoing, based on the total amount of polypropylene present in the composition.

5. The thermoplastic olefin composition of claim 1, wherein the polypropylene is crystalline polypropylene.

6. The thermoplastic olefin composition or claim 1, wherein the polypropylene has a melt index of less than or equal to about 1 grain per 10 minutes, when measured according to as ASTM test method D-1238 at 230° C., employing a 2.16 kilogram mass.

7. The thermoplastic olefin composition of claim 1, wherein the ethylene copolymer concentration is about 40 to about 65 wt %, based on the total weight or the composition.

8. The thermoplastic olefin composition of claim 1, wherein the ethylene copolymer includes ethylene propylene rubber, ethylene butene rubber. ethylene octene rubber, or a combination comprising at least one of the foregoing.

9. The thermoplastic olefin composition of claim 1, wherein the ethylene copolymer has a glass transition temperature of less than or equal to about negative 70° C.

10. The thermoplastic olefin composition of claim 1, wherein the ethylene copolymer includes an ethylene-propylene non-conjugated diene copolymer (EPDM).

11. The thermoplastic olefin composition of claim 10, wherein the non-conjugated dienes component of the EPDM includes about 6 to about 22 carbon atoms, and has at least one readily polymerizable carbon-carbon double bond.

12. The thermoplastic olefin composition of claim 10, wherein the EPDM includes and uncrosslinked ethylene propylene copolymer rubber portion having about 60 to about 80 wt % ethylene, based on the total weight of the EPDM.

13. The thermoplastic olefin composition of claim 10, wherein the EPDM includes a non-conjugated diene portion present at about 1 to about 7 wt %. based on the total weight of the EPDM.

14. The thermoplastic olefin composition of claim 10, wherein the EPDM copolymer is ethylene propylene-1,4-hexadiene, ethylene propylene dicyclopentadiene, ethylene propylene norbornene, ethylene propylene-methylene-2-norbornene, ethylene propylene-1,4-hexadiene/norbornadiene copolymer, or a combination comprising at least one of the foregoing.

15. The thermoplastic olefin composition of claim 1, wherein the ethylene copolymer has a melt index or less than or equal to about 1 g/10 min, when measured according to ASTM D-1238 at 230° C., employing a 2.16 kilogram mass.

16. The thermoplastic olefin composition of claim 1, wherein the linear low density polyethylene concentration is about 5 to about 20 wt %, based on the total weight of the composition.

17. The thermoplastic olefin composition of claim 1, wherein the
   linear low density polyethylene has a melt index of about 0.05 to about 5.0 g/10 min, when measured according to method ASTM D-1238 at 230° C., employing a 2.16 kilogram mass.

18. The thermoplastic olefin composition of claim 1, further comprising a free radical initiator having a concentration of about 0.05 to about 0.5 wt % based upon the total weight of the thermoplastic olefin composition.

19. The thermoplastic olefin composition of claim 18, wherein the free radical initiator is an organic peroxide having a half life of less than or equal to about 1 hour at a temperature of greater than or equal to about 100° C.

20. The thermoplastic olefin composition of claim 19, wherein the organic peroxide is 1,1-di-t-butyl peroxy-3,3,5-trimethyl cyclohexane, dicumyl peroxide, 2,5-dimethyl-2,5-di(t-butyl peroxy) hexane, t-butyl-cumyl peroxide, di-t-butyl peroxide, 2,5-dimethyl- 2,5-di-(t-butyl peroxy) hexyne, or a combination comprising at least one of the foregoing.

21. The thermoplastic olefin composition of claim 1, further comprising a pre-radical controlling co-agent component having a concentration of about 0.05 to about 0.5 wt %, based upon tho total weight of the thermoplastic olefin composition.

22. The thermoplastic olefin composition of claim 21, wherein the pre-radical controlling co-agent component includes tri-methylolpropane trimethacrylate.

23. The thermoplastic olefin composition of claim 1, further comprising a heat stabilizer, a light stabilizer, or a combination comprising at least one of the foregoing.

24. The thermoplastic olefin composition of claim 23, wherein the heat stabilizer includes phenolics, hydroxyl amines, phosphites, or a combination comprising at least one of the foregoing.

25. The thermoplastic olefin composition of claim 23, wherein the light stabilizer includes a hindered amine having a number-average molecular weight less than about 1,000 AMU, a hindered amine having a number-average molecular weight greater than about 1,000 AMU, or a combination comprising at least one of the foregoing.

26. The thermoplastic olefin composition of claim 1, further comprising a color additive having a concentration of less than or equal to about 10 wt %, based upon the total weight of the thermoplastic olefin composition.

27. The thermoplastic olefin composition of claim 26, wherein the color additive is a pigment, dye, or a combination comprising at least one of the foregoing.

28. The thermoplastic olefin composition of claim 1, wherein the composition has a melt index of about 1 to about 20 g/10 min, when measured according to method ASTM D-1238 at 230° C., employing a 2.16 kilogram mass.

29. The thermoplastic olefin composition of claim 1, wherein the melt index is less than or equal to about 10 g/10 mm, when measured according to method ASTM D-1238 at 230° C., employing a 2.16 kilogram mass.

30. The thermoplastic olefin composition of claim 1, wherein the melt index is less than or equal to about 6 g/10 min, when measured according to method ASTM D-1238 at 230° C., employing a 2.16 kilogram mass.

31. A thermoplastic olefin composition, comprising a reaction product or, based in the total weight of the composition:
about 20 wt % to about 40 wt % polypropylene, wherein the polypropylene comprises polypropylene homopolymer;
about 20 wt % to about 70 wt % ethylene copolymer;
less than or equal to about 30 wt % linear low density polyethylene; and
a free radical initiator, a pre-radical controlling co-agent component, or both.

32. The thermoplastic olefin composition of claim 31, wherein the free radical initiator has a concentration of about 0.05 to about 0.5 wt % based upon the total weight of the thermoplastic olefin composition.

33. The thermoplastic olefin composition or claim 31, wherein the free radical initiator is an organic peroxide having a half life of loss than or equal to about 1 hour at a temperature of greater than or equal to about 100° C.

34. The thermoplastic olefin composition of claim 33, wherein the organic peroxide is 1,1-di-t-butyl peroxy-3,3,5-trimethyl cyclohexane, dicumyl peroxide, 2,5-dimethyl-2,5-di(t-butyl peroxy) hexane, t-butyl-cumyl peroxide, di-t-butyl peroxide. 2,5-dimethyl- 2,5-di-(t-butyl peroxy) hexyne, or a combination comprising at least one of the foregoing.

35. The thermoplastic olefin composition of claim 31, wherein the pre-radical controlling co-agent component has a concentration of about 0.05 to about 0.5 wt %, based upon the total weight of the thermoplastic olefin composition.

36. The thermoplastic olefin composition of claim 35, wherein the pre-radical controlling co-agent component includes tri-methylolpropane trimethacrylate.

37. The thermoplastic olefin composition of claim 31, further comprising a heat stabilizer, a light stabilizer, or a combination comprising at least one of the foregoing.

38. The thermoplastic olefin composition of claim 37, wherein the heat stabilizer includes phenolics, hydroxyl amines, phosphites, or a combination comprising at least one of the foregoing.

39. The thermoplastic olefin composition of claim 9, wherein the light stabilizer includes a hindered amine having a number-average molecular weight less than about 1,000 AMU, a hindered amine having a number-average molecular weight greater than about 1,000 AMU, or a combination comprising at least one of the foregoing.

40. The thermoplastic olefin composition of claim 31, further comprising a color additive having a concentration of less than or equal to about 10 wt %, based upon the total weight of the thermoplastic olefin composition.

41. The thermoplastic olefin of claim 40, wherein the color additive is a pigment, dye, or a combination comprising at least one of the foregoing.

42. An article of manufacture comprising, based on the total weight:
about 20 wt % to about 40 wt % polypropylene, wherein the polypropylene comprises polypropylene homopolymer;
about 20 wt % to about 70 wt % ethylene copolymer; and
less than or equal to about 30 wt % linear low density polyethylene.

43. An automotive assembly comprising, based on the total weight of the assembly:
about 20 wt % to about 40 wt % polypropylene, wherein the polypropylene comprises polypropylene homopolymer;
about 20 wt % to about 70 wt % ethylene copolymer; and
less than or equal to about 30 wt % linear low density polyethylene.

44. The automotive assembly of claim 43, wherein the assembly is a sheathing, an instrument panel skin, a door panel, an airbag cover, a door trim, a roof liner, a scat cover, or a combination comprising at least one of the foregoing.

45. the automotive assembly of claim 43, further comprising loss than or equal to about 15 wt % polyethylene, polypropylene-polyethylene block copolymer, random polypropylene-polyethylene copolymer or a combination comprising at least one of the foregoing, based on the total amount of polypropylene present in the composition.

46. The automotive assembly of claim 43, wherein the polypropylene is crystalline polypropylene.

47. The automotive assembly of claim 43, wherein the polypropylene has a melt index of less than or equal to about 1 gram per 10 minutes, when measured according to as ASTM test method D-1238 at 230° C. employing a 2.16 kilogram mass.

48. The automotive assembly of claim 43, wherein the ethylene copolymer has a melt index of less than or equal to about 1 g/10 min, when measured according to ASTM D-1238 at 230° C., employing a 2.16 kilogram mass.

49. The automotive assembly of claim 43, wherein the linear low density polyethylene has a melt index of about 0.05 to about 5.0 g/ 10 min, when measured according to method ASTM D-1238 at 230° C., employing a 2.16 kilogram mass.

50. The automotive assembly of claim 43, further comprising a free radical initiator having a concentration of about 0.05 to about 0.5 wt % based upon the total weight of the thermoplastic olefin composition.

51. The automotive assembly of claim 50, wherein the free radical initiator is an organic peroxide having a half life of less than or equal to about 1 hour at a temperature of greater than or equal to about 100° C.

52. The automotive assembly of claim 51, wherein the organic peroxide is 1,1-di-t-butyl peroxy-3,3,5-trimethyl cyclohexane dicumyl peroxide, 2,5-dimethyl-2,5-di(t-butyl peroxy) hexane, t-butyl-cumyl peroxide, di-t-butyl peroxide, 2,5-dimethyl- 2.5-di-(t-butyl peroxy) hexyne, or a combination comprising at least one of the foregoing.

53. The automotive assembly of claim 43, further comprising a pre-radical controlling co-agent component having a concentration of about 0.05 to about 0.5 wt %, based upon the total weight of the thermoplastic olefin composition.

54. The automotive assembly of claim 53, wherein the pre-radical controlling co-agent component includes trimethylolpropane trimethacrylate.

55. The automotive assembly of claim 43, further comprising a heat stabilizer, a light stabilize, or a combination comprising at least one of the foregoing.

56. The automotive assembly of claim 55, wherein the heat stabilizer includes phenolics, hydroxyl amines, phosphites, or a combination comprising at least one of the foregoing.

57. The automotive assembly of claim 55, wherein the light stabilizer includes a hindered amine having a number-average molecular weight less than about 1,000 AMU, a hindered amine having a number-average molecular weight greater than about 1,000 AMU, or a combination comprising at leas one of the foregoing.

58. The automotive assembly of claim 43, further comprising a color additive having a concentration of less than or equal to about 10 wt %, based upon the total weight of the thermoplastic olefin composition.

59. The automotive assembly of claim 58, wherein the color additive is a pigment, dye, or a combination comprising at least one of the foregoing.

60. The automotive assembly of claim 43, wherein the composition has a melt, index of about 1 to about 20 g/10 min, when measured according to method ASTM D-1238 at 230° C., employing a 2.16 kilogram mass.

61. The automotive assembly of claim 43, wherein the melt index is less than or equal to about 10 g/10 min, when measured according to method ASTM D-1238 at 230° C., employing a 2.16 kilogram mass.

62. The automotive assembly of claim 43, wherein the melt index is less than or equal to about 6 g/10 min, when measured according to method ASTM D-4238 at 230° C., employing a 2.16 kilogram mass.

63. An automotive assembly, comprising a reaction product of, based on the total weight of the composition:
about 20 wt % to about 40 wt % polypropylene, wherein the polypropylene comprises polypropylene homopolymer;
about 20 wt % to about 70 wt % ethylene copolymer;
less than or equal to about 30 wt % linear low density polyethylene; and
a free radical initiator, a pre-radical controlling co-agent component, or both.

64. The thermoplastic olefin composition of claim 1, comprising greater than or equal to about 5 wt % of the linear low density polyethylene.

65. The thermoplastic olefin composition of claim 64, comprising less than or equal to about 20 wt % of the liner low density polyethylene.

66. The thermoplastic olefin composition of claim 65, comprising less than or equal to about 10 wt % of the linear low density polyethylene.

67. The thermoplastic olefin composition of claim 1, wherein the ethylene copolymer comprises ethylene octene rubber.

68. The thermoplastic olefin composition of claim 31, wherein the ethylene copolymer comprises ethylene octene rubber.

69. The article of manufacture of claim 42, wherein the ethylene copolymer comprises ethylene octene rubber.

70. The automotive assembly of claim 43, wherein the ethylene copolymer comprises ethylene octene rubber.

71. The automotive assembly of claim 63, wherein the ethylene copolymer comprises ethylene octene rubber.

72. A thermoplastic olefin composition, comprising, based on the total weight of the composition:
about 20 wt % to about 40 wt % polypropylene homopolymer;
about 30 wt % to about 70 wt % ethylene copolymer; and
about 10 wt % to about 30 wt % linear low density polyethylene.

73. The composition of claim 72, wherein the linear low density polyethylene is about 25 wt % to about 30 wt %.

74. The composition of claim 72, wherein the polypropylene, the ethylene copolymer homopolymer, and the linear low density polyethylene each have a melt index or less than or equal to about 1 g/10 min, measured at 230° C., employing a 2.16 kg weight.

75. The composition of claim 72, further comprising about 0.5 wt % to about 10 wt % color additive, based upon the total weight of the thermoplastic olefin composition.

76. The composition of claim 75, further comprising about 1 wt % to about 5 wt % of the color additive.

77. The composition or claim 72, comprising about 30 wt % to about 50 wt % of the ethylene copolymer.

78. The composition of claim 72, wherein the ethylene copolymer further comprises EPDM, and wherein, the EPDM comprises about 40 wt % to about 60 wt % ethylene, based on the total weight of the EPDM.

79. The composition of claim 72, further comprising about 0.05 to about 4 wt % stabilizers, based upon the total weight of the thermoplastic olefin composition.

80. The composition of claim 72, further comprising about 0.05 wt % to about 0.5 wt % free radical initiators, based upon the total weight of the thermoplastic olefin composition.

81. The composition of claim 80, further comprising about 0.1 wt % up to about 0.4 wt % of the free radical initiators, wherein the free radical initiators comprise an organic peroxide.

82. The composition of claim 72, further comprising about 0.05 wt % to about 0.5 wt % of a pre-radical controlling co-agent.

83. The composition of claim 72, wherein the co-agent comprises tri-methylolpropane trimethacrylate.

84. The composition of claim 72, wherein the ethylene copolymer is selected from the group consisting of ethylene propylene rubber, ethylene butene rubber, ethylene octene rubber, and combinations comprising at least one of the foregoing ethylene copolymers.

85. The composition of claim 72, wherein the ethylene copolymer comprises ethylene octene rubber.

86. The composition of claim 85, wherein the ethylene copolymer is ethylene octene rubber.

87. An article of manufacture made from the composition of claim 72.

88. The article of manufacture of claim 86, wherein the article of manufacture is selected from the group consisting of sheathing, instrument panel skins, airbag housing covers, and door trims.

89. A thermoplastic olefin composition, comprising, based on the total weight of the composition:
- about 20 wt % to about 40 wt % polypropylene homopolymer;
- about 20 wt % to about 60 wt % ethylene copolymer; and
- about 10 wt % to about 30 wt % linear low density polyethylene.

90. The composition of claim 89, comprising about 20 wt % to about 30 wt % of the linear low density polyethylene.

* * * * *